United States Patent [19]

Lerma et al.

[11] Patent Number: 4,842,316
[45] Date of Patent: Jun. 27, 1989

[54] PICNIC TRAILER APPARATUS

[76] Inventors: Larry Lerma, Rte. #1, Box 405; Demetrio Lerma, Jr., Rte. #1, Box 407, both of Abilene, Tex. 79601; Faustino Lerma, Jr., 1938 Park, Abilene, Tex. 79603

[21] Appl. No.: 181,216
[22] Filed: Apr. 11, 1988
[51] Int. Cl.$^4$ ................................................ B60P 3/02
[52] U.S. Cl. ...................................... 296/22; 296/173; 296/24.2
[58] Field of Search ....................... 296/22, 24.1, 24.2, 296/156, 165, 168, 172, 173; 280/47, 35, 79.2

[56] References Cited

U.S. PATENT DOCUMENTS

| | | | |
|---|---|---|---|
| 3,207,527 | 9/1965 | Sundberg | 280/43.23 |
| 3,556,581 | 1/1971 | Da Silva | 296/173 |
| 3,741,606 | 6/1973 | Grier | 296/22 |
| 3,889,967 | 6/1975 | Sauer | 280/47.35 |
| 3,940,175 | 2/1976 | Robison | 296/22 |
| 4,086,849 | 5/1978 | Simmons | 99/357 |
| 4,364,310 | 12/1982 | Rufkahr | 99/357 |

FOREIGN PATENT DOCUMENTS

2171365  8/1986  United Kingdom ................. 296/22

Primary Examiner—Sherman D. Basinger
Assistant Examiner—Jesûs D. Sotelo
Attorney, Agent, or Firm—Hubbard, Thurman, Turner & Tucker

[57] ABSTRACT

A picnic trailer has a wheeled rear frame upon which picnic food preparation equipment, such as a hooded cooking grille, a sink and a burner plate, is operatively supported. An elongated towbar extends forwardly from the rear frame and is connectable to a suitable towing vehicle. A vertical support frame structure interconnects the rear frame and a longitudinally intermediate portion of the towbar, and carries a collapsible, roofed picnic table structure. A rear end portion of the towbar, and a pair of diagonally oriented towing brace members, are pivotally connected to the longitudinally intermediate portion of the towbar and are releasably connectable to the rear frame for towing purposes. When the trailer is parked, and the picnic table and roof portions thereof set up for use, the brace members and the towbar rear end portion may be swung away from the rear frame to form a convenient walkthrough area between the picnic table and the cooking equipment on the rear frame.

19 Claims, 4 Drawing Sheets

PICNIC TRAILER APPARATUS

BACKGROUND OF THE INVENTION

The present invention relates generally to trailer devices, and more particularly provides a uniquely constructed picnic trailer having a collapsible, roofed picnic table and an adjacent picnic food preparation station.

In the past, a variety of multi-purpose trailer devices have been proposed that incorporate picnic-type cooking and/or table apparatus. For example, in U.S. Pat. No. 3,940,175 to Robison a small hollow trailer body internally carries a pair of benches, an ice chest, and a small self-contained cooking stove each of which may be pivoted outwardly of the trailer body to define therewith a compact picnic station, with the upper surface of the trailer body forming a table top. Separate roof struts are provided and may be individually secured to the trailer body and used to support a roof member thereover.

U.S. Pat. Nos. 4,086,849 to Simmons and 4,364,310 to Rufkahr disclose trailerable broiler and barbecue structures, with the Simmons device having a table top slidably carried in brackets for movement between a storage position in which it covers the open top of the cooking grille, and an extended position in which it forms a food support surface adjacent the cooking structure.

U.S. Pat. No. 3,741,606 to Grier discloses a camping trailer having bench type seats telescoped into its body, and fold-down side panels used to form table tops adjacent the bench seats on opposite sides of the trailer body.

With respect to defining a complete, yet easily and rapidly formable picnic station, each of these conventional trailerable structures has various limitations and disadvantages. For example, the Robison trailer structure, due to its configuration, is capable of integrally carrying only a very limited amount of picnic cooking equipment. Additionally, its roof structure must be erected from separate, loose components which can easily be misplaced. The Simmons and Rufkahr devices provide for larger cooking capabilities, but do not have built-in picnic table structures with integral seats. The Grier camping trailer, while providing integral seat and table top structure does not contain built-in picnic food cooking and preparation equipment.

In view of the foregoing, it is an object of the present invention to provide improved picnic trailer apparatus which may be easily and quickly converted into a complete picnic station including a roofed picnic table and a conveniently positioned picnic food preparation station adjacent thereto.

SUMMARY OF THE INVENTION

In carrying out principles of the present invention, in accordance with a preferred embodiment thereof, an improved picnic trailer is provided that incorporates a collapsible, roofed picnic table and an adjacent picnic food preparation station separated from the table by a convenient walk through area sheltered by a portion of the table's roof.

The trailer includes a wheel mounted rear frame upon which suitable picnic food cooking and preparation equipment, such as a hooded cooking grille, a sink, and a burner plate, is operatively mounted. An elongated towbar structure extends forwardly from the rear frame and has a front end portion connectable to a suitable towing vehicle, a longitudinally intermediate portion, and a rear end portion releasably connectable to the rear frame. A wheeled leveling jack is operatively secured to the front towbar end portion and is used to support and level the towbar when it is disconnected from the towing vehicle.

A vertical support frame structure interconnects the rear frame and the longitudinally intermediate portion of the towbar and includes vertical front, central and rear support posts. The front and central support posts are secured at their lower ends to the longitudinally intermediate portion of the towbar in a laterally spaced relationship, and the rear support post is secured at its lower end to the rear frame. A horizontal beam member intersecures upper end portions of the three support posts. The rear support post is of a hollow construction and serves as a flue for the hooded cooking grille, being operatively connected to a flue gas opening therein.

A collapsible, roofed picnic table structure is carried by the vertical support frame structure and includes a table top member pivotally secured between lower longitudinal portions of the front and central support post members for movement between a vertical storage position in which the table top member extends upwardly along facing side surfaces of these two support posts, and a horizontal use position in which the table top member extends laterally in opposite directions beyond such support posts. A pair of seat members are pivotally secured to opposite sides of the lower ends of the front and central support posts and are movable between vertical storage positions in which the seat members extend upwardly along opposite sides of such support posts and sandwich the table top member in its vertical storage position, and a use position in which the seat members extend horizontally outwardly from opposite sides of such support posts.

The collapsible roof portion of the picnic table is defined by a pair of roof panel members which are pivotally secured to the horizontal beam member, on opposite sides thereof, and extend rearwardly from the front support post member past the central support post member. The roof panel members are pivotable between a vertical storage position in which they extend downwardly along the front and central support post members so that the bottom side edges of the panels are directly above the top side edges of the seat members in their vertical storage positions, and a use position in which the roof panels extend generally horizontally outwardly from opposite sides of the beam member. Secured to the upper side surface of such beam member is a generally inverted U-shaped channel member which serves as an elongated drip cap to prevent water leakage through a central portion of the erected roof.

The roof panels and the table top member are provided with suitable bracing elements which may be releasably connected to adjacent portions of the vertical frame structure to hold the roof panels and the table top member in their outwardly pivoted use positions. Additionally, suitable latch means are provided on the vertical frame structure for releasably holding the roof panel members and the seat members in their vertical storage positions.

The rear end portion of the towbar is pivotable in a vertical plane between a vertical storage position in which it may be latched to a lower end portion of the central support post, and a horizontal towing position in which it may be releasably connected to the rear frame to directly connect the towbar to the rear frame for towing purposes. A pair of elongated towing brace members are pivotally connected to the longitudinally intermediate portion of the towbar for movement in a horizontal plane between a storage position in which the brace members extend forwardly along the longitudinally intermediate towbar portion and may be latched thereto, and a towing position in which the brace members extend diagonally rearwardly from the towbar and may be releasably connected at their outer ends to the rear frame.

When the trailer is pulled to a suitable picnic site, the towbar may be disconnected from the towing vehicle and then supported and leveled using the leveling jack mechanism mounted on the towbar. The rear end portion of the towbar, and the diagonal bracing members, may then be disconnected from the rear frame and pivoted to and latched in their storage positions to create the previously mentioned walkthrough area between the central support post and the rear frame. The roof panels and the seat members may then be unlatched from the front and central support post members and pivoted outwardly to their use positions and locked therein. The tabletop member may then be pivoted to its horizontal use position and releasably locked in such position. The roof panels are appropriately sized such that the erected roof extends over the entire picnic table and the walkthrough area immediately behind it.

With these simple erection steps, the picnic trailer may be rapidly converted from its relatively compact towing orientation to a complete and quite conveniently configured total picnic station. The trailer may be just as easily and quickly returned to its compact towing configuration simply by reversing the erection steps. Specifically, the table top is pivoted to its vertical storage position and the seat members are pivoted upwardly and inwardly to their storage position and latched to the front and central support post members to automatically hold the table top in its vertical orientation. The roof panels may then be pivoted downwardly to their storage positions and quickly latched to the front and central support post members. The rear towbar end portion, and the diagonal bracing members, may then be pivoted to their towing positions and secured to the rear frame. Finally, the front end of the towbar is reconnected to the towing vehicle and the trailer is ready to be pulled away from the picnic site.

The picnic trailer of the present invention is relatively easy and inexpensive to construct from readily available standard components, is rapidly and quite easily changeable between its towing and use positions, and provides a very complete and enjoyable portable picnic station.

DETAILED DESCRIPTION

Figure 1:
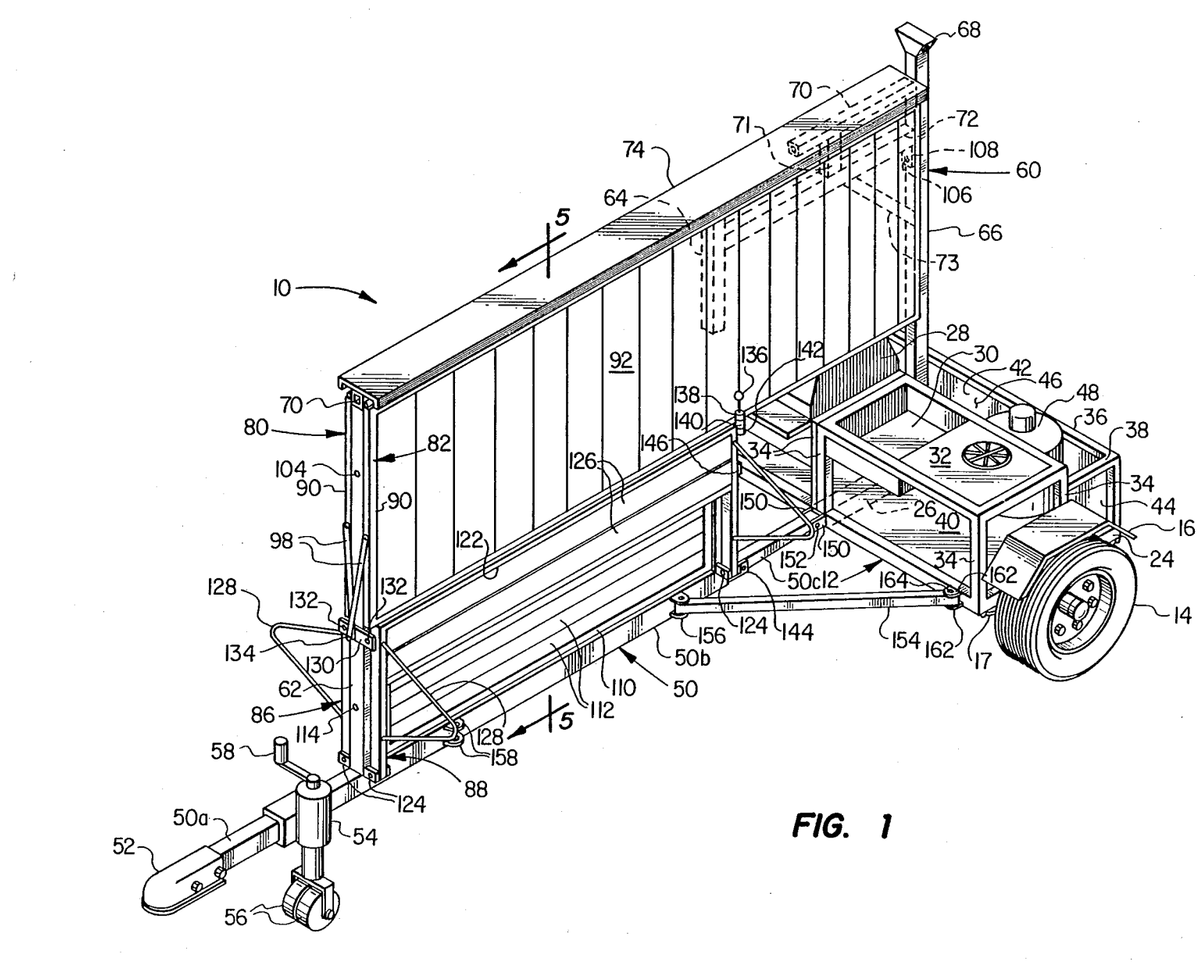
FIG. 1 is a perspective view of a picnic trailer of the present invention with a collapsible, roofed picnic table portion thereof in its collapsed towing position.

Perspectively illustrated in FIG. 1 is a picnic trailer 10 which embodies principles of the present invention and may be pulled to a suitable picnic site by a towing vehicle, and then quickly converted to a convenient picnic station including a roofed picnic table and a closely adjacent picnic food preparation area.

The trailer 10 includes an elongated, generally rectangular rear frame 12 supported in an elevated, horizontal position by wheels 14 operatively mounted on the opposite ends of the frame and provided with fenders 16. Conventional leaf springs 17 are also provided (see FIG. 4). Frame 12 is formed from front and rear side members 18 and 20 (see FIG. 3 also), left and right end members 22 and 24, and an intermediate member 26 secured at its opposite ends to central portions of the front and rear side members 18 and 20. Picnic cooking equipment, in the form of a hooded cooking grille 28, a sink 30, and a burner plate 32, are supported on a front side portion of the frame 12 in an elevated position by means of suitable support legs 34 secured at their lower ends to appropriate portions of the frame 12.

Extending upwardly from a rear side edge portion of the frame 12 is a frame structure 36 which is secured to the rear legs 34 at the opposite ends of the cooking equipment by means of horizontal frame sections 38. A metal bottom panel 40 is suitably secured within the rear frame 12, and rear side and end panels 42 and 44 are secured within the frame structure 36 to define an open-topped storage area 46 which extends beneath and to the rear of the food preparation equipment. A propane tank 48 (shown only in FIGS. 1 and 2) may be conveniently mounted within a rear portion of this storage area and used to provide fuel to the burner plate 32 and, if desired, the hooded cooking grille 28. Alternatively, grille 28 may be of a wood or charcoal burning type.

An elongated towbar 50 extends forwardly from a central portion of the rear frame member 18 and has a front end portion 50$_a$, a longitudinally intermediate portion 50$_b$, and a rear end portion 50$_c$ which, in a manner subsequently described is releasably connectable to the frame member 18. At its outer end, the front towbar end portion 50$_a$ is provided with a hitch fitting 52 for connection to a suitable towing vehicle. The front end portion 50$_a$ is also provided with a conventional support jack 54 having a pair of wheels 56 positioned at its lower end and adapted to rest upon the ground and support the towbar 50 in an elevated, horizontal position above the ground when the hitch fitting 52 is disconnected from the towing vehicle. The towbar 50 may be leveled relative to the ground simply by turning a crank handle 58 to selectively vary the overall vertical dimension of the support jack 54.

Figure 3:
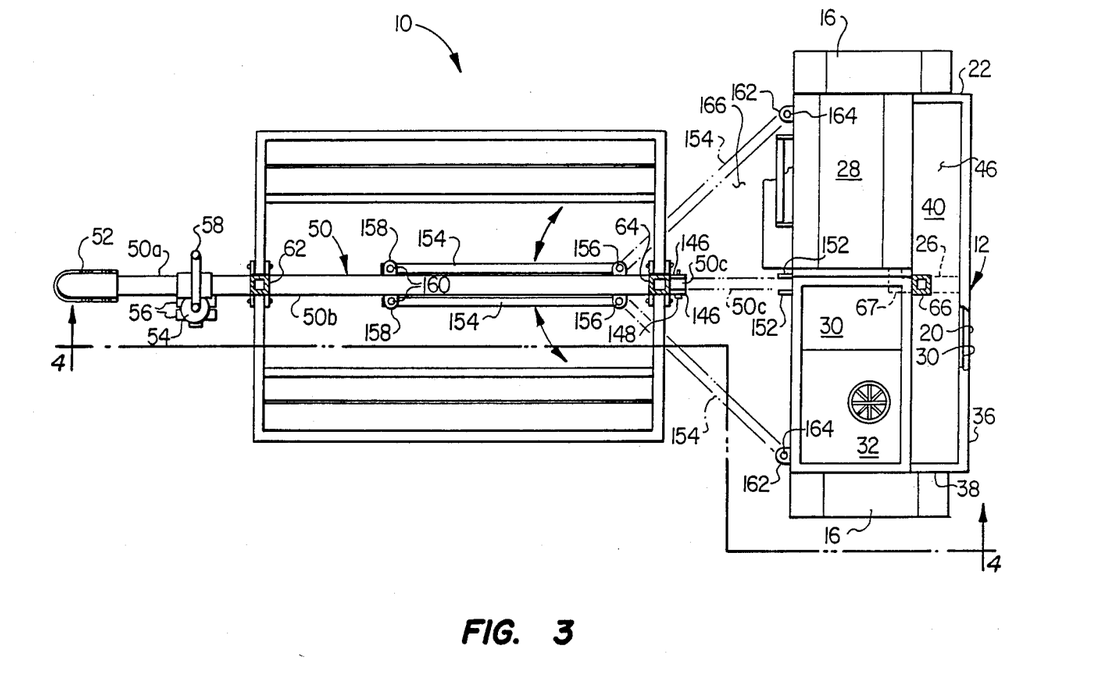
FIG. 3 is a reduced scale cross-sectional view through the trailer, partially in elevation, taken along line 3—3 of FIG. 2.
Figure 4:
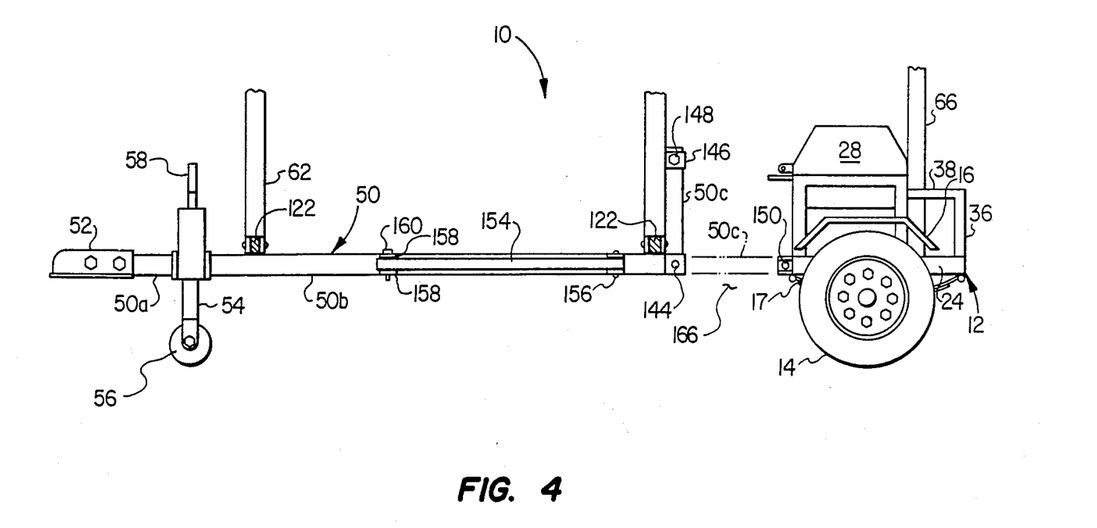
FIG. 4 is a fragmentary cross-sectional view through the trailer, partially in elevation, taken along line 4—4 of FIG. 3.

Referring now to FIGS. 1, 3 and 4, the trailer 10 also comprises a vertical support frame structure 60 which interconnects the rear frame 12 and the longitudinally intermediate portion 50$_b$ of the towbar 50. The frame structure 60 includes a vertical front support post 62 secured at its lower end to a front end portion of the intermediate towbar section 50b, a vertical central support post 64 secured at its lower end to the rear end of the intermediate towbar section 50b, and a vertical rear support post 66 secured at its lower end to the central rear frame member 26 immediately behind the food preparation equipment. As best illustrated in FIG. 3, each of these three support posts 62, 64 and 66, like the towbar 50 and the components of the rear frame 12, has a hollow, rectangular cross-section.

The rear support post 66 extends somewhat higher than the other two support posts and is provided at its upper end with a vent cap fitting 68. Rear support post 66 conveniently functions as a flue for the cooking grille 28, being operatively connected to an exhaust gas outlet opening in the base thereof by a suitable outlet fitting 67 (FIG. 3).

Figure 5:
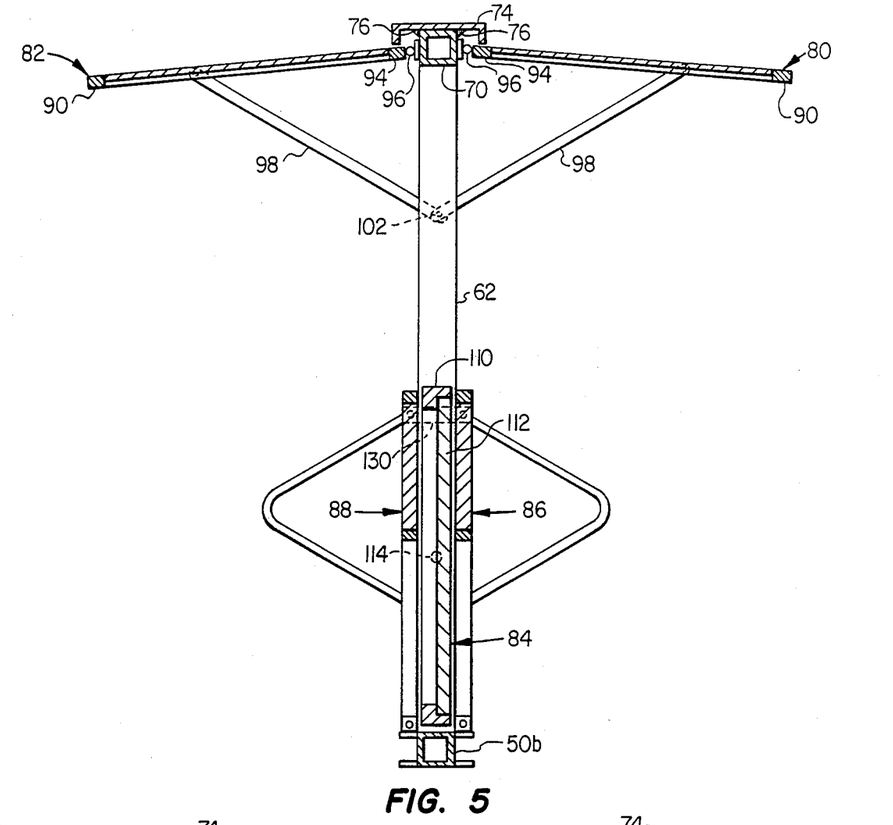
FIG. 5 is a cross-sectional view through the trailer, taken along line 5—5 of FIG. 1, illustrating the picnic table roof portion thereof moved to its use position.

The upper ends of posts 62 and 64, and an upper end portion of the post 66 beneath the vent cap 68, are secured to a horizontally extending beam member 70 which is of a similar cross-sectional configuration. A supplemental horizontal beam member 72 is secured at its opposite ends to the support posts 64 and 66 in a downwardly spaced relationship with the main support beam 70. The lower horizontal beam member 72 is braced to the upper horizontal beam member 70 by a short vertical member 71, and is also braced to the rear support post 66 by a diagonal support member 73. The support frame structure 60 also includes a horizontally extending channel member 74 which, as best illustrated in FIG. 5, has an inverted, generally U-shaped cross-section. For purposes later described, a laterally central portion of the channel member 74 is fixedly secured, as by tack welds 76, to the upper side surface of the beam member 70. As can be seen in FIG. 1, the front end of the channel member 74 is generally aligned with the vertical post 62, while the rear end of the channel member 74 is positioned intermediately of the support posts 64 and 66.

The vertical support frame structure 60 just described not only interconnects the rear frame 12 to the longitudinally intermediate towbar section 50b, but is also used to support a collapsible, roofed picnic table structure which will now be described with initial reference to FIGS. 1 and 2. The picnic table structure includes a pair of elongated rectangular roof panel assemblies 80 and 82, an elongated rectangular table top member 84, and a pair of seat members 86 and 88. Each of the roof panel assemblies 80, 82 includes an elongated rectangular metal frame 90 which is generally equal in length to the channel member 74 and supports a roof panel 92 formed from fiberglass or other suitably weatherproof material.

As best illustrated in FIG. 5, inner sides 94 of the frames 90 are pivotally secured to opposite, horizontally facing sides of the beam 70, directly below the channel member 74, by elongated hinge elements 96. This permits the roof panel assemblies 80, 82 to be selectively pivoted between a collapsed storage position (FIG. 1) in which each of the roof panel assemblies 80, 82 extends downwardly along the support posts 62 and 64, and an extended use position in which the roof panel assemblies 80, 82 extend generally horizontally outwardly from opposite sides of the beam 70, but are slightly downwardly sloped for drainage purposes. To releasably hold the roof panel assemblies 80, 82 in their use position, a pair of elongated support bars 98 are pivotally connected at their inner ends to the front ends of the roof panel frames 90, while a pair of elongated support bars 100 are pivotally connected at their inner ends to the rear ends of the frames 90.

With the roof panel assemblies 80, 82 swung outwardly to their use positions in a manner subsequently described, a small pin member 102 is inserted through suitable openings formed through the outer ends of the support bars 98 and into a small opening 104 (FIG. 1) formed in the front support post 62. In an similar manner, a pin 104 is inserted through openings formed in the outer ends of the support bars 100 and into a small opening 106 formed in a support bracket 108 secured to the underside of the beam 72. As can best be seen in FIG. 5, the channel member 74 defines an elongated drip cap disposed over a laterally central portion of the roof defined by the panel assemblies 80, 82 in their use positions to thereby prevent water leakage through the hinges 96.

Figure 7:
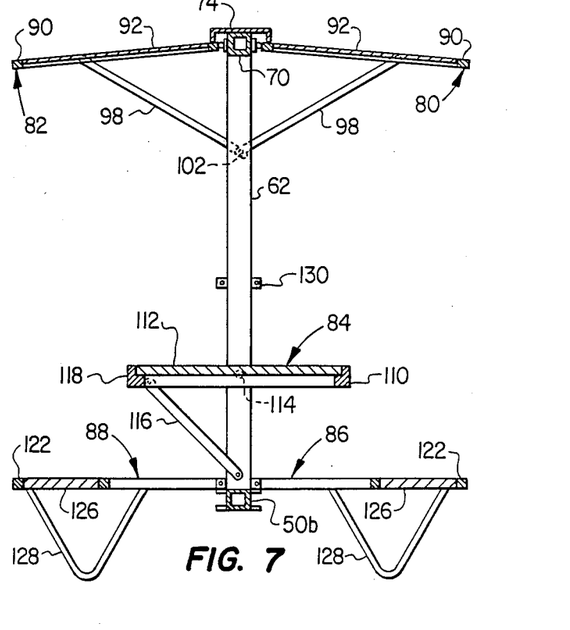

The table top member 84 is formed from an elongated rectangular metal frame 110 within which a series of wooden planks 112 are secured. Frame 110 extends lengthwise between lower end portions of the support posts 62 and 64 with central portions of the opposite frame ends being pivoted at points 114 to such support posts. This permits the table top member 84 to be pivoted relative to the support posts 62, 64 between a vertical storage position in which the table top member 84 is disposed entirely between lower longitudinal portions of the posts 62 and 64 (FIG. 5), and a horizontal use position (FIG. 2) in which opposite sides of the table top member 84 project laterally beyond opposite sides of the posts 62, 64. To releasably hold the table top member 84 in its horizontal use position, a pair of elongated support bars 116 (see FIGS. 2 and 7) are pivotally connected at their inner ends to the opposite ends of the table top frame 110 adjacent the side 118 thereof. With the table top member 84 pivoted to its use position, the outer ends of these support bars 116 may be releasably pinned, as at 120, to the lower ends of the support posts 62, 64.

Figure 6:
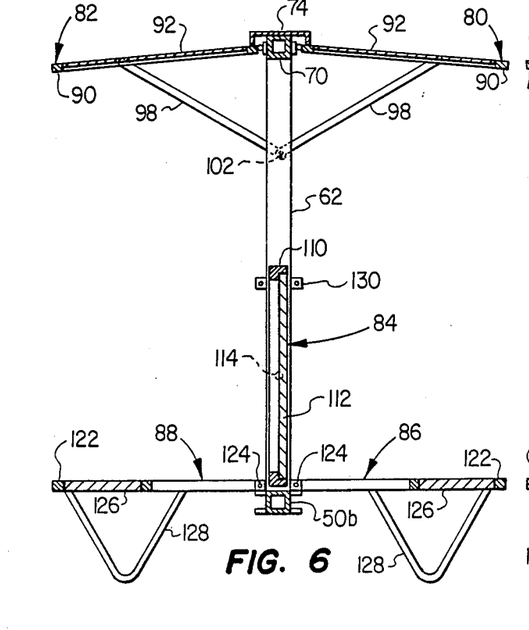
FIG. 6 and 7 are smaller scale cross-sectional views similar to that of FIG. 5 and sequentially illustrate the manner in which the table top and seat portions of the picnic table are moved from their stowed towing positions to their use positions.

Each of the seat members 86, 88 comprises an elongated, generally U-shaped rectangular frame 122, the free ends of such seat frames being pivotally connected to opposite sides of the lower ends of the vertical support posts 62, 64 as at points 124. Suitable wooden seat planks 126 are supported within outer side portions of the frames 122, and generally V-shaped metal ground support members 128 are anchored to the opposite ends of the frames 122, as by welding, adjacent the outer side edges of the frames. As may be seen by comparing FIGS. 5 and 6, the seat members 86 and 88 are movable between a vertical storage position (FIG. 5) in which the seat members extend upwardly along the support posts 62, 64 and sandwich the table top member 84 in its vertical storage position, and an outwardly pivoted horizontal use position (FIG. 6) in which the seat members extend horizontally outwardly on opposite sides of the posts 62, 64 and are supported by the members 128 which rests upon the ground.

With the roof panels, the table top member and the seat members pivoted to their vertical storage positions as depicted in FIG. 1, these elements of the trailer 10 are neatly and compactly positioned along the vertical support posts 62 and 64 with lower side edges of the roof panel frames 90 being closely adjacent the upper sides of the seat frames 122.

Forward end portions of the roof panel assemblies 80, 82 and the seat members 86 and 88 are releasably locked to the support post 62 by means of a small rectangular metal latch plate 130 secured transversely to the front side surface of the support post 62 adjacent the juncture of the roof panel and seat member frames 90, 122. Suitable locking pins 132 are extended through openings in the latch plate 130 into the seat frames 122, while a similar pin 134 is extended through the outer ends of the front roof support bars 98, through the latch plate 130 and into the support post 62.

Rear end portions of the roof panel assemblies and the seat members are similarly held in their vertical storage positions along opposite sides of the support post 64 by means of a removable locking pins 136 inserted through aligned sets of metal collar members 138, 140 and 142 respectively secured to the roof panel frames 90, opposite sides of the support post 64, and the rear ends of the seat frames 122. With the picnic table-defining elements vertically secured in this manner to the support posts 62 and 64, a relatively compact towing package is formed which provides substantially unimpeded driver rear visibility along opposite sides thereof.

Referring now to FIGS. 1, 3 and 4, the rear end portion 50c of the towbar 50 is pivotally connected at point 144 to the right end of the intermediate towbar section 50b for movement in a vertical plane between a solid line vertical position in which the towbar section 50c extends upwardly along the support post 64, and a dotted line position in which the towbar section 50c is horizontally disposed. With the towbar section 50c in its vertical position, an upper end thereof is received between a pair of bracket members 146, the towbar section 50c being lockable to such brackets by means of a removable pin member 148. With the towbar section 50c in its horizontal position, its outer end is received between a pair of connection brackets 150 anchored to a central portion of the rear frame member 18. The towbar section 50c may be releasably locked in this horizontal position, to provide a direct towing connection between the towbar and the rear frame 12, by means of a locking pin 152 insertable through the brackets 150 and the outer end of the towbar section 50c.

This direct connection between the towbar 50 and the rear frame 12 is augmented by a pair of elongated bracing arm members 154 which are pivoted at inner ends thereof to opposite sides of the towbar section 50b at points 156 positioned forwardly of the intermediate support post 64. The bracing arm members 154 are pivotable in a horizontal plane between a solid line storage position in which they extend forwardly along opposite sides of the towbar section 50b, and dotted line positions in which they extend diagonally rearwardly from their pivot points 156 to opposite end portions of the rear frame member 18. With the bracing arm members 154 in their forwardly extending storage positions, their outer ends are received between pairs of brackets 158 secured to opposite sides of the towbar section 50b and may be retained therein by means of locking pins 160. With the bracing arm members 154 in their rearwardly extended towing positions, their outer ends are received between bracket pairs 162 secured to opposite ends of the rear frame member 18, and may be releasably locked within such bracket pairs by suitable pins 164.

When the rear towbar section 50c and the bracing arm members 154 are in their solid line storage positions depicted in FIGS. 3 and 4, a convenient walkthrough space 166 is formed between the intermediate support post 64 and the cooking equipment supported upon the rear frame 12, the front portion of the vertical frame structure 60 being supported by the jack mechanism 54.

After the trailer 10 has been towed (in its orientation depicted in FIG. 1) to a suitable picnic site, the towbar 50 is disconnected from the towing vehicle, and the jack 54 is used to support and level the towbar 50. The trailer 10 is then easily and quickly converted to the complete picnic structure depicted in FIG. 2 in the following manner.

The rear towbar section 50c and the bracing arm members 154 are disconnected from the rear frame member 18 and pivoted to and locked in their storage positions as depicted in FIGS. 3 and 4 to create the walkthrough area 166 between the intermediate support post 64 and the cooking equipment supported on the rear frame 12. The locking pins 134 and 136 (FIG. 1) are then removed and the roof panel assemblies 80, 82 are pivoted upwardly to their use positions (FIG. 5) and locked therein utilizing the front and rear support bars 98, 100 as previously described. The seat members 86, 88 are then pivoted downwardly to their horizontal use positions (FIG. 6) in which they are supported on the ground by their ground support members 128. Finally, the table top member 84 is pivoted from its vertical position (FIG. 6) to its horizontal position (FIG. 7) and locked therein utilizing the support bars 116 as previously described.

Figure 2:
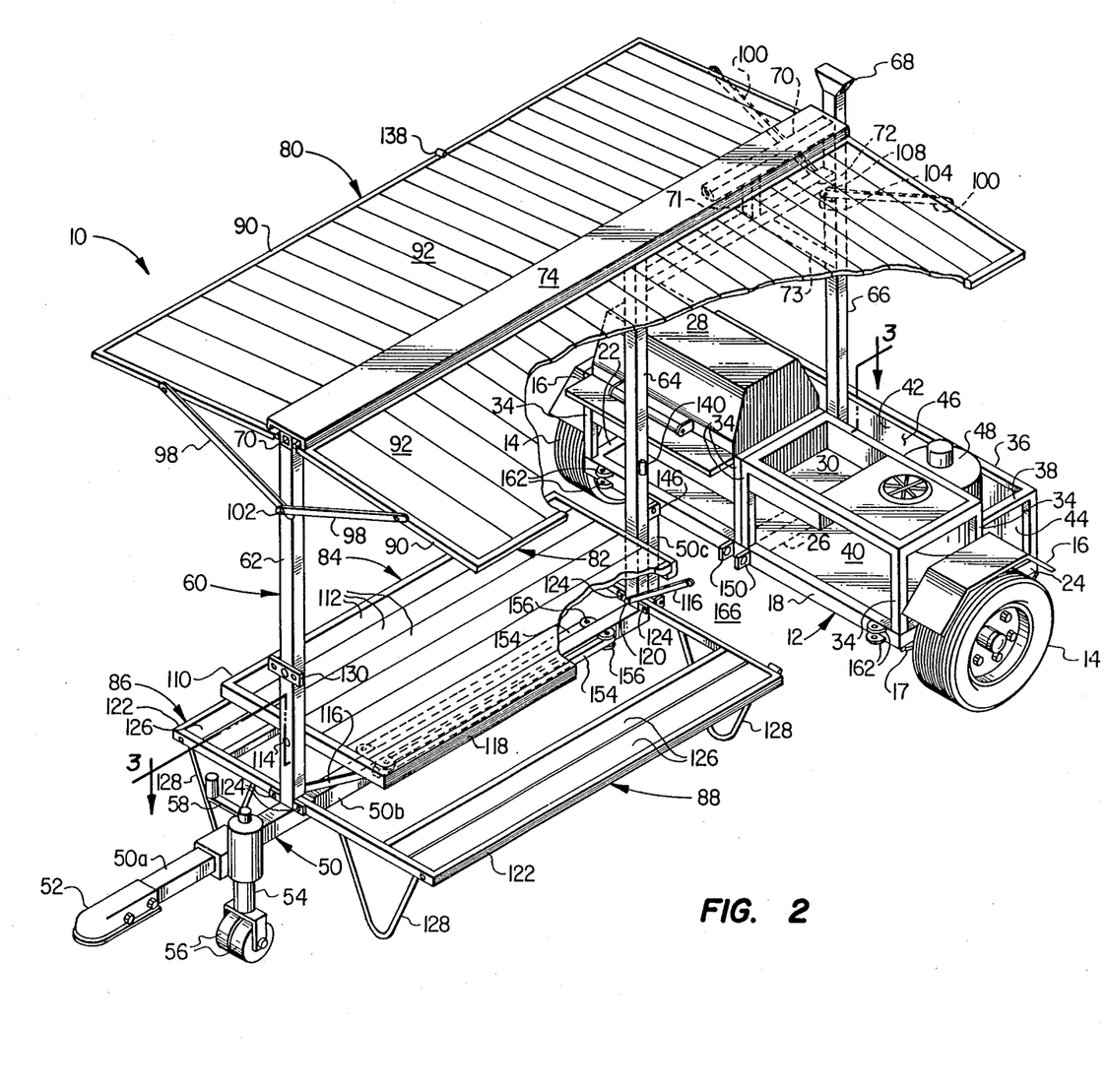
FIG. 2 is a partially cut away perspective view similar to that of FIG. 1, but with the picnic table portion in its expanded use position.

In this very simple manner, the complete picnic station pictured in FIG. 2 is rapidly formed to provide a full size picnic table conveniently adjacent the cooking area and sheltered by a large roof which extends over the walkthrough area 166. As the food is prepared at the rearwardly disposed cooking station it may be placed directly on the closely adjacent table top. At the end of the picnic, these simple steps are simply reversed to bring the trailer 10 to its transport position depicted in FIG. 1.

It can be seen from the foregoing that the present invention provides a significantly improved picnic trailer that compactly incorporates a complete, towable picnic station which may be easily and very rapidly set up and then just as easily and quickly collapsed into a convenient towing package. It will be readily apparent that the trailer 10 may be relatively inexpensively formed from readily available standard components which are easy to manufacture and assemble.

The foregoing detailed description is to be clearly understood as being given by way of illustration and example only, the spirit and scope of the present invention being limited solely by the appended claims.

What is claimed is:

1. Picnic trailer apparatus comprising:
   wheel mounted rear frame means for supporting picnic food preparation equipment;
   picnic food preparation equipment operatively supported on said rear frame means;
   elongated towbar means extending longitudinally forwardly from said rear frame means and pullable by a towing vehicle to move said rear frame means along the ground;
   a support frame structure secured to and extending upwardly from a longitudinally intermediate portion of said towbar means; and
   a collapsible picnic table carried by said support frame structure above said towbar means and including:

a table top member pivotally mounted on said support frame structure for movement between horizontal and vertical positions, first and second seat members pivotally mounted on opposite sides of said support frame structure for movement between a horizontal position in which said seat members project laterally outwardly of said towbar means in opposite directions, and a vertical position in which said seat members extend upwardly along said support frame structure and sandwich said table top member in its vertical position, and means for releasably holding said seat members in said vertical position thereof to thereby hold said table top member in its vertical position.

2. The picnic trailer apparatus of claim 1 wherein:

said picnic table further includes a collapsible roof portion carried by said support frame structure above said table top member and including first and second roof panel members pivotally connected to opposite sides of an upper portion of said support frame structure for movement relative thereto between a generally horizontal position in which said roof panels extend generally horizontally outwardly from said support frame structure, and a vertical position in which said roof panels extend downwardly along opposite sides of said support frame structure, means for releasably holding said roof panels in said horizontal position thereof, and means for releasably holding said roof panels in said vertical position thereof.

3. The picnic trailer apparatus of claim 2 wherein:

said support frame structure has a horizontally disposed upper rear end portion which extends rearwardly over said rear frame means, and a vertical rear end member secured to said rear frame means, and said towbar means have a rear end portion releasably connectable to said rear frame means and movable relative to the balance of said towbar means in a manner permitting a walkthrough space to be selectively created between said rear frame means and said longitudinally intermediate portion of said towbar means.

4. Picnic trailer apparatus comprising:

frame means for supporting picnic food preparation equipment;

wheel means for supporting said frame means in an elevated position relative to the ground for movement therealong;

elongated towbar means longitudinally extending forwardly of said frame means and pullable to move said frame means along the ground, said towbar means having a front end portion connectable to a towing vehicle, a longitudinally intermediate portion, and support means for supporting said front end portion in an elevated position relative to the ground when said front end portion is removed from the towing vehicle;

first and second vertically extending, laterally spaced post members secured at lower ends thereof to said longitudinally intermediate portion of said towbar means;

a table top member positioned between said first and second post members;

means for securing said table top member to longitudinally intermediate portions of said first and second post members for pivotal movement relative thereto between a storage position in which said table top member is essentially vertically disposed between said first and second post members, and a use position in which said table top member is essentially horizontally disposed and projects laterally outwardly of said longitudinally intermediate portions of said first and second post members in opposite directions to define an elevated picnic table top;

means for releasably holding said table top member in said use position thereof;

first and second seat members;

means, adjacent said lower ends of said first and second post members, for supporting said first and second seat members for pivotal movement between a storage position in which said first and second seat members are generally vertically disposed on opposite sides of said first and second post members and sandwich said table top member in its storage position, and a use position in which said first and second seat members extend generally horizontally outwardly on opposite sides of said first and second post members adjacent said lower ends thereof;

means for releasably holding said first and second seat members in said storage position thereof with said table top member in its storage position being sandwiched therebetween;

first and second roof panel members;

means, adjacent the upper ends of said first and second post members, for mounting said first and second roof panels for pivotal movement between a storage position in which said first and second roof panel members are generally vertically disposed on opposite sides of said first and second post members, and a use position in which said first and second roof panel members are generally horizontally disposed on opposite sides of said first and second post members, adjacent said upper ends thereof, and define a roof over said table top member;

means for releasably holding said first and second roof panel members in said use position thereof; and means for releasably holding said first and second roof panel members in said storage position thereof.

5. The picnic trailer apparatus of claim 4 wherein:

said means for mounting said first and second roof panel members include a horizontally disposed beam member extending between and secured to the upper ends of said first and second post members, and means for pivotally securing side edge portions of said first and second roof panel members to opposite sides of said beam member.

6. The picnic trailer apparatus of claim 5 wherein:

said apparatus further comprises an elongated, horizontally extending channel member having, along its length, a generally inverted U-shaped cross-section, said channel member having a laterally central portion of its underside secured to an upper side surface of said beam member and defining a drip cap disposed over adjacent side edge portions of said first and second roof panel members in their use positions.

7. The picnic trailer apparatus of claim 5 wherein:

said apparatus further comprises a third vertically extending post member secured at a lower end thereof to said frame means, said beam member extends rearwardly of said first and second post members and is secured to said third post member adjacent its upper end, and said towbar means have a rear end portion removably securable to said frame means, said rear end portion being pivotally secured to said longitudinally intermediate portion of said towbar means for movement relative thereto between a towing position in which said rear end portion extends between said longitudinally intermediate position of said towbar means and said frame means, and a stowed position in which said rear end portion is swung away from said frame means to create a walkthrough area between said frame means and said tabletop and seat members.

8. The picnic trailer apparatus of claim 7 wherein:

said apparatus further comprises picnic food preparation equipment including a hooded grille having a flue gas outlet opening, said third post member is hollow, has an open upper end portion, and defines an exhaust flue, and said apparatus further comprises means for operatively connecting said flue gas outlet opening to said flue.

9. The picnic trailer apparatus of claim 4 wherein:

said apparatus further comprises picnic food preparation equipment operatively mounted on said frame means.

10. The picnic trailer apparatus of claim 9 wherein:

said food preparation equipment includes a sink and cooking apparatus.

11. The picnic trailer apparatus of claim 10 wherein:

said cooking apparatus includes a hooded cooking grille and a burner plate.

12. Picnic trailer apparatus comprising:

wheel mounted rear frame means for supporting picnic food preparation equipment;

elongated towbar means extending longitudinally forwardly from said rear frame means and pullable to move said rear frame means along the ground, said towbar means including:

a front end portion releasably connectable to a towing vehicle, support means for supporting said front end portion in an elevated position relative to the ground when said front end portion is disconnected from the towing vehicle, a longitudinally intermediate portion spaced forwardly of said rear frame means, and a rear end portion selectively interconnectable between said longitudinally intermediate portion and said rear frame portion for towing purposes and movable relative to said longitudinally intermediate portion to create a walkthrough area between said longitudinally intermediate portion and said rear frame means;

a vertical frame structure interconnecting said rear frame means and said longitudinally intermediate portion of said towbar means, said vertical frame structure including;

first and second vertical post members secured at their lower ends to said longitudinally intermediate portion of said towbar means in a laterally spaced relationship, a third vertical post member secured at its lower end to said rear frame means, and a horizontal beam member extending between and intersecuring upper end portions of said first, second and third post members; and means for defining a collapsible, roofed picnic table carried by said frame structure and said longitudinally intermediate portion of said towbar means, including:

a table top member pivotally connected between said first and second post members and movable between horizontal and vertical positions, means for releasaly holding said table top member in said horizontal position thereof, pivotally mounted first and second seat members movable between a storage position in which said seat members extend upwardly along opposite sides of said first and second post members and sandwich said table top member in its vertical position, and a use position in which said seat members extend horizontally outwardly beyond said longitudinally intermediate portion of said towbar means and below said table top member in its horizontal position, means for releasably holding said first and second seat members in said storage position thereof, first and second roof panel members, means for pivotally mounting said first and second roof panel members on opposite sides of an upper end portion of said frame structure for movement between a storage position in which said first and second roof panel members extend downwardly along opposite sides of said frame structure, and a use position in which said first and second roof panel members extend generally horizontally outwardly from opposite sides of said upper end portion of said frame structure, means for releasably holding said first and second roof panels in said storage position thereof, and means for releasably holding said first and second roof panel members in said use position thereof.

13. The picnic trailer apparatus of claim 12 wherein:

said apparatus further comprises picnic food preparation equipment operatively mounted on said rear frame means for movement therewith.

14. The picnic trailer apparatus of claim 13 wherein:

said picnic food preparation equipment includes a hooded cooking grille having a flue gas outlet opening, said third post member is hollow, has an open upper end portion, and defines an exhaust flue, and said apparatus further comprises means for operatively connecting said flue gas outlet opening to said flue.

15. The picnic trailer apparatus of claim 13 wherein:

said picnic food preparation equipment includes a hooded cooking grille, a sink, and a burner plate.

16. The picnic trailer apparatus of claim 13 wherein:

said apparatus further comprises a bottom panel carried by said rear frame means, and side and rear panels projecting upwardly from said bottom panel and defining therewith a storage area which projects rearwardly of said picnic food preparation equipment.

17. The picnic trailer apparatus of claim 12 wherein:

said rear end portion of said towbar means is connected at an inner end thereof to the rear end of said longitudinally intermediate portion of said towbar means for pivotal movement relative thereto in a vertical plane between a stowed position in which said rear end portion extends upwardly along the rearmost one of said first and second post members, and a towing position in which said rear end portion is horizontal and its outer end is adjacent said rear frame means, and said apparatus further comprises means for releasably holding said rear end portion of said towbar means in said stowed position, and means for releasably connecting the outer end of said rear end portion to said rear frame means when said rear end portion is pivoted downwardly to its towing position.

18. The picnic trailer apparatus of claim 17 further comprising:

first and second elongated towing brace members connected at inner ends thereof to opposite sides of said longitudinally intermediate portion of said towbar means for pivotal movement relative thereto in a horizontal plane between a stowed position in which said first and second towing brace members extend forwardly along opposite sides of said longitudinally intermediate portion of said towbar means, and a towing position in which said first and second towing brace members extend rearwardly from opposite sides of said longitudinally intermediate portion of said towbar means at an angle relative thereto with their outer ends adjacent said rear frame means, means for releasably holding said first and second towing brace members in their stowed position, and means for releasably connecting the outer ends of said first and second towing brace members to said rear frame means when said first and second towing brace members are in their towing position.

19. The picnic trailer apparatus of claim 12 further comprising:

an elongated, horizontally extending channel member having, along its length, a generally inverted U-shaped cross-section, said channel member having a laterally central portion of its underside secured to an upper side surface of said beam member and defining a drip cap disposed over adjacent inner side edge portions of said first and second roof panel members in their use positions.

* * * * *